(12) United States Patent  
Cohen (10) Patent No.: US 11,713,267 B2  
(45) Date of Patent: Aug. 1, 2023

(54) MODULAR WATER PURIFICATION SYSTEM

(71) Applicant: AYALA PNBS LTD., Moshav Zippori (IL)

(72) Inventor: Doron Eliahu Cohen, Moshav Zippori (IL)

(73) Assignee: AYALA PNBS LTD., Moshav Zippori (IL)

( * ) Notice: Subject to any disclaimer, the term of this patent is extended or adjusted under 35 U.S.C. 154(b) by 266 days.

(21) Appl. No.: 17/255,462

(22) PCT Filed: Aug. 21, 2019

(86) PCT No.: PCT/IB2019/057037  
§ 371 (c)(1),  
(2) Date: Dec. 23, 2020

(87) PCT Pub. No.: WO2020/044173  
PCT Pub. Date: Mar. 5, 2020

(65) Prior Publication Data  
US 2021/0317022 A1    Oct. 14, 2021

Related U.S. Application Data

(60) Provisional application No. 62/722,905, filed on Aug. 26, 2018.

(51) Int. Cl.  
*C02F 3/32* (2023.01)  
*C02F 103/00* (2006.01)  
*C02F 103/06* (2006.01)

(52) U.S. Cl.  
CPC ........ *C02F 3/327* (2013.01); *C02F 2103/007* (2013.01); *C02F 2103/06* (2013.01);  
(Continued)

(58) Field of Classification Search  
CPC ................ C02F 3/327; C02F 2103/007; C02F 2103/06; C02F 2201/007; C02F 2203/006;  
(Continued)

(56) References Cited

U.S. PATENT DOCUMENTS 5,389,257 A * 2/1995 Todd ......................... C02F 1/32  
210/602  
5,772,887 A    6/1998 Noah et al.  
(Continued)

FOREIGN PATENT DOCUMENTS

CN    1923722 A    3/2007  
CN    101824811 A    9/2010  
(Continued)

OTHER PUBLICATIONS

CN Application # 2019800549325 Office Action dated Jan. 29, 2022.  
(Continued)

*Primary Examiner* — Fred Prince  
(74) *Attorney, Agent, or Firm* — Kligler & Associates Patent Attorneys Ltd (57) ABSTRACT

A system (20, 70) for water treatment includes a plurality of containers (22, 24, 26, 80) which are configured to be stacked one on another for shipment and to deployed in a row at different, respective heights at a water treatment site. Each container includes an inlet (37, 86) at a first side of the container and an outlet (88) at a second side of the container, opposite the first side. The containers are filled with substrates (36, 38, 40) configured for planting of aquatic plants (60) therein and including at least different first and second substrates for filling the first and second containers, respectively. Piping includes at least an inlet pipe (34) for connection to the inlet of a first container, a transfer pipe (64, 66) for connection between the outlet of the first container  
(Continued)

and the inlet of a second container, and an outlet pipe (41) for connection to the outlet of the second container.

22 Claims, 9 Drawing Sheets

(52) U.S. Cl.
CPC .. *C02F 2201/007* (2013.01); *C02F 2203/006* (2013.01); *C02F 2203/008* (2013.01); *C02F 2209/42* (2013.01); *C02F 2301/04* (2013.01); *Y02W 10/10* (2015.05); *Y02W 10/37* (2015.05)

(58) Field of Classification Search
CPC ............ C02F 2203/008; C02F 2209/42; C02F 2301/04; Y02W 10/10; Y02W 10/37
USPC ........................................................ 210/602
See application file for complete search history.

(56) References Cited

U.S. PATENT DOCUMENTS

| | | | |
|---|---|---|---|
| 6,126,827 | A | 10/2000 | Johnson, Jr. et al. |
| 2008/0179240 | A1 | 7/2008 | Kauppi et al. |
| 2008/0245714 | A1* | 10/2008 | Bauer .................... C02F 3/327 |
| | | | 210/153 |
| 2011/0168721 | A1* | 7/2011 | Waite .................... C02F 3/1242 |
| | | | 220/553 |
| 2011/0186507 | A1* | 8/2011 | Ernest .................... C02F 3/327 |
| | | | 210/602 |
| 2014/0001127 | A1 | 1/2014 | Hymel et al. |

FOREIGN PATENT DOCUMENTS

| | | |
|---|---|---|
| CN | 102531287 A | 7/2011 |
| CN | 205314235 U | 6/2016 |
| CN | 206521289 U | 9/2017 |
| CN | 207347366 U | 5/2018 |
| DE | 29704850 U1 | 9/1997 |
| DE | 202006007963 U1 | 7/2006 |
| DE | 202011051132 U1 | 11/2011 |
| EP | 2657414 A2 | 10/2013 |
| JP | 2008068211 A | 3/2008 |

OTHER PUBLICATIONS

EP Application # 19855838.9 Search Report dated Mar. 15, 2022.
IN Application # 202147002068 Office Action dated Apr. 19, 2021.
Ayala Aqua, pp. 1-22, Jul. 27, 2018 (downloaded from https://web.archive.org/web/20180727142624/http://www.ayala-aqua.com/).
Kato et al., "Design and Performance of Hybrid Constructed Wetland Systems for High-content Wastewater Treatment in the Cold Climate of Hokkaido, Northern Japan," Water Science and Technology, vol. 68, No. 7, pp. 1468-1476, Oct. 1, 2013.
International Application # PCT/IB2019/057037 Search Report dated Dec. 9, 2019.

\* cited by examiner

MODULAR WATER PURIFICATION SYSTEM

CROSS-REFERENCE TO RELATED APPLICATION

This application claims the benefit of U.S. Provisional Patent Application 62/722,905, filed Aug. 26, 2018, which is incorporated herein by reference.

FIELD OF THE INVENTION

The present invention relates generally to water purification, and particularly to systems and methods for biological water purification.

BACKGROUND

Almost a billion people worldwide do not have access to a reliable source of drinking water source. At the same time, due to a lack of affordable treatment options, sewage produced in many places around the world is discarded or reused in an uncontrolled manner, thereby perpetuating a vicious cycle of pollution of water sources.

The pollution and depletion of fresh water supplies is particularly acute in rural settlements located in developing countries. As the distance from big cities grows, pipelines to centralized water distribution networks become prohibitively expensive, and many communities still rely on local water sources such as wells and rivers. Sewage disposal is usually accomplished, if at all, by open oxidation ponds or burial, thus exposing local residents to health hazards due to inadequate treatment of biological contaminants. More sophisticated systems for local water purification and sewage treatment are generally beyond the reach of such communities due to their cost, complexity and energy consumption.

SUMMARY

Embodiments of the present invention that are described hereinbelow provide improved systems and methods for water purification.

There is therefore provided, in accordance with an embodiment of the invention, a system for water treatment, which includes a plurality of containers, including at least first and second containers, which are configured to be stacked one on another for shipment and to deployed in a row at different, respective heights at a water treatment site such that the first container is deployed at a first elevation and the second container is deployed in proximity to the first container at a second elevation, below the first elevation. Each container includes an inlet at a first side of the container and an outlet at a second side of the container, opposite the first side. Substrates configured for planting of aquatic plants therein include at least different first and second substrates for filling the first and second containers, respectively. Piping includes at least an inlet pipe for connection to the inlet of the first container, a transfer pipe for connection between the outlet of the first container and the inlet of the second container, and an outlet pipe for connection to the outlet of the second container.

In a disclosed embodiment, the containers are rectangular and are at least three meters long and two meters wide and may be at least five meters long.

In a disclosed embodiment, the plurality of the containers includes a third container, which is configured to be deployed in proximity to the second container at a third elevation, below the second elevation.

In some embodiments, the containers include a mounting mechanism, which is disposed at upper and lower sides of respective corners of the containers and is configured to hold the stacked containers together during shipment and to be released in order to permit deployment of the system.

In a disclosed embodiment, the containers include a bottom surface and a mesh flooring, which is disposed at a predefined height above the bottom surface and is configured to hold the substrates that are filled into the containers, thereby permitting water to flow through a space in the containers below the mesh flooring. Additionally or alternatively, one or more vertical partitions are configured for insertion into at least one of the containers so as to divide the at least one of the containers into multiple compartments, which are configured to contain different ones of the substrates.

In some embodiments, at least one of the containers includes an adjustable equalization tank adjacent to the outlet for controlling a water level in the at least one of the containers. In one embodiment, the equalization tank includes a pipe having an inlet end and an outlet end with a bend between the inlet and outlet ends, wherein the outlet end is rotatably connected to the outlet, whereby a height of the inlet end is adjustable by rotation of the outlet end about the outlet. Alternatively, the equalization tank includes a siphon, which is connected to the outlet and is configured to induce a rapid variation of a water level in the at least one of the containers, thereby aerating a substrate in the at least one of the container.

In a disclosed embodiment, the first container is configured to serve as settling chamber for separation of solids from water that is input to the system.

Typically, the different substrates are selected from a group of compositions consisting of dolomite, carbonaceous aggregates, basalt, tufa, clay bid, igneous aggregate, peat, organic compost and bark.

There is also provided, in accordance with an embodiment of the invention, a method for water treatment, which includes conveying to a water treatment site on a truck bed a plurality of containers, including at least first and second containers, which are stacked one on another on the truck bed, each container including an inlet at a first side of the container and an outlet at a second side of the container, opposite the first side. The containers are deployed in a row at different, respective heights at the water treatment site such that the first container is deployed at a first elevation and the second container is deployed in proximity to the first container at a second elevation, below the first elevation. An inlet pipe is connected to convey contaminated water at the water treatment site to the inlet of the first container. A transfer pipe is connected between the outlet of the first container and the inlet of the second container. An outlet pipe is connected to draw purified water from the outlet of the second container. The deployed containers are filled with substrates, including at least different first and second substrates in the first and second containers, respectively. Multiple different types of aquatic plants are planted in the substrates in the containers.

The present invention will be more fully understood from the following detailed description of the embodiments thereof, taken together with the drawings in which:

DETAILED DESCRIPTION OF EMBODIMENTS

Overview

Embodiments of the present invention provide a portable, sustainable water purification system that operates on the basis of natural biological processes. It can be installed simply and quickly at substantially any accessible location, requires little or no maintenance, and consumes no energy. The system comprises containers that can be stacked and transported on the back of a flatbed truck and then separated and unpacked on site. The containers are deployed to create a cascaded sequence of pools for water treatment using aquatic plants, special gravel and other substrates, and dedicated natural additives. The system is affordable and environmentally friendly, requires only minimal expertise to install and maintain, and can be applied in any climate and environment. It thus provides a solution for many locations and situations without requiring special infrastructure, complicated earthworks, or skilled personnel.

Once deployed, the system receives waste water at its inlet and produces a continuous supply of purified water at its outlet. The level of purification and flow rate of the system may be adjusted to accommodate the quality of the waste water—ranging from slightly-contaminated runoff water to actual sewage—and the required purity of the output water. The selection of substrates, additives, hydrology and plants to use in each of the pools in the sequence can be chosen and optimized for different degrees of water purification, depending on the intended use. For example, under typical operational conditions, a system comprising three pools with a total area of about 40 m$^2$ can supply up to 35 cubic meters of drinking water daily from a nearby slightly-contaminated well, lake, river or aquifer. A similar system can treat up to 12 cubic meters of domestic sewage daily for irrigation purposes or up to about four cubic meters daily for direct human reuse.

The cascaded pools used in embodiments of the present invention are fabricated as parts of a container-based modular system: In some embodiments, when the containers are stacked, the resulting unit has the shape and dimensions of a standard shipping container or can fit conveniently into such a container. Thus, the system can be transported cheaply over long distances using existing transportation infrastructure. The containers can then be separated and assembled at the water purification site, in a rural community, for example, within a matter of hours, using standard earth moving and lifting equipment. If required, the containers can be emptied, re-stacked, moved, and then deployed at a different location.

The embodiments that are described hereinbelow provide a system for water treatment comprising multiple, modular containers, which are stacked one on another for shipment, for example on a truck bed. Each container comprises an inlet at one side of the container and an outlet at the opposite side. The containers are unloaded and deployed in a row at different, respective heights at a water treatment site, so as to enable gravitational flow from one container to the next. Thus, the second container is deployed in proximity to the first container at an elevation below that of the first container; and a third container can be deployed in proximity to the second container, at an elevation that is lower still. (Although the embodiments shown in the figures use three containers in this manner, larger or smaller numbers of containers may alternatively be used, in series and/or in parallel, depending on the volume of water that is to be purified and the target water quality.) The simple, modular structure of the system is unique and innovative and makes the solution suitable for substantially any location, community and culture around the globe. The absence of electromechanical components extends the lifetime of the system and reduces its vulnerability to vandalism.

An inlet pipe is connected to convey contaminated water at the water treatment site to the inlet of the first container. A transfer pipe connects the outlet of the first container to the inlet of the next container. An outlet pipe is connected to draw purified water from the second and subsequent containers, either to the following container in the cascade or from the final container to the system output. The system may be supplied with flexible pipes that are easy to cut and connect, in order to allow fast and simple connectivity. The containers, thus deployed, are filled with substrates, typically including a different type of substrate in each container, which may be separated into dedicated chambers, thus allowing flexible use and change of gravel according to need. Multiple different types of aquatic plants are planted in the substrates in the containers. Plants can be supplied in the form of seeded matrices, hardened tissue cultures, or mature plants from dedicated nurseries. The choices of substrates and plants can be optimized for each deployment depending on factors such as the condition of the waste water, the desired level of purification, and the local climate.

Special soil additives can also be added according to climate conditions, type of plants and expected sewage type. These additives can be designed and developed to support resilient plant growth and biosphere development.

The ability of the system to flexibly support different hydrology regimes enhances the system efficiency. These hydrology regimes can modified and adapted according to the needs of installation, for example to increase nitrification effects over denitrification when desired.

System Description

Figure 1:
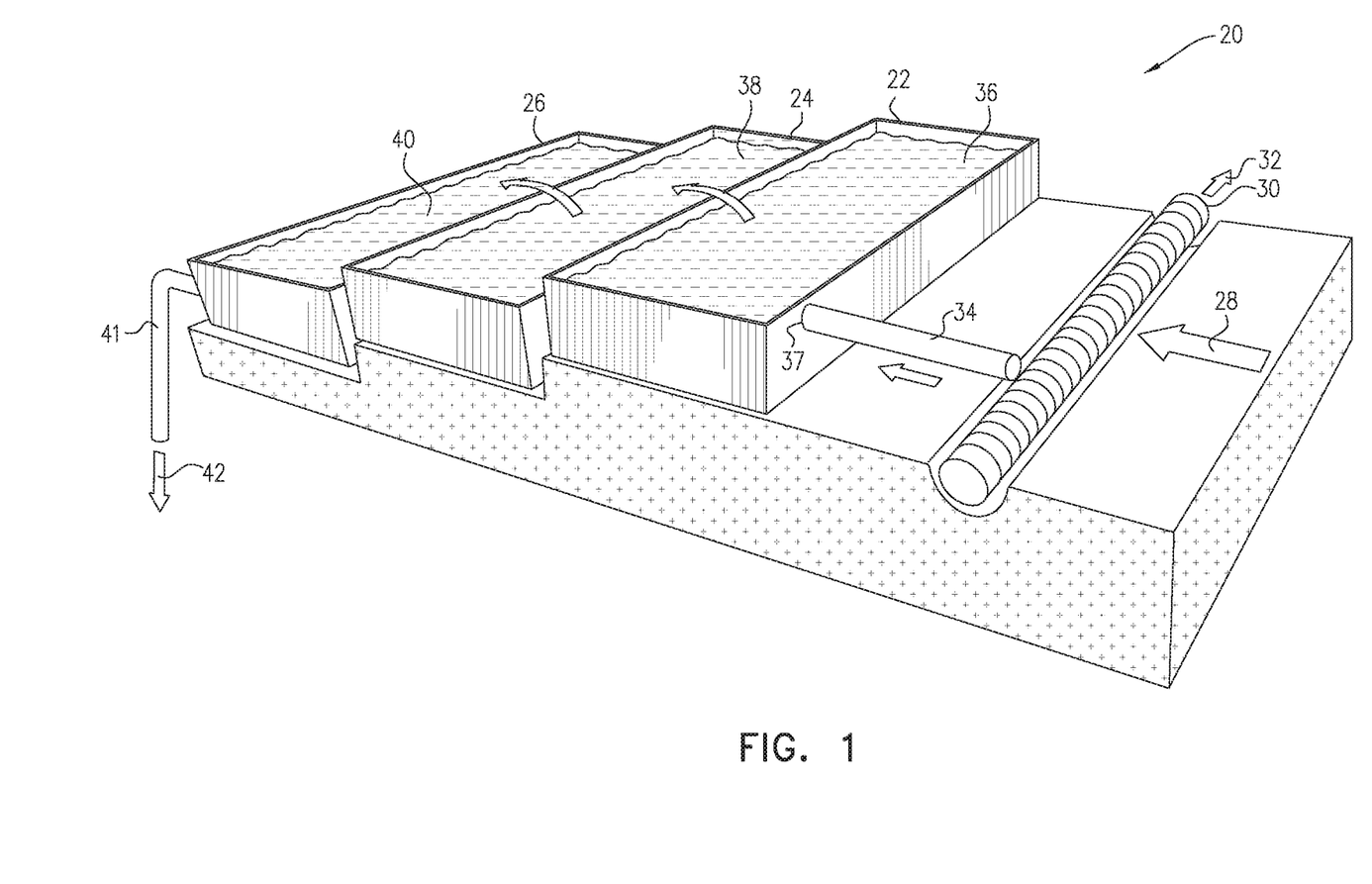
FIG. 1 is schematic pictorial illustration of a water purification system, in accordance with an embodiment of the invention.

FIG. 1 is schematic pictorial illustration of a water purification system 20, in accordance with an embodiment of the invention. System 20 comprises a series of cascaded pools in containers 22, 24 and 26, which are deployed in a row at different, respective heights at a water treatment site. Thus, container 22 is deployed at a first elevation, container 24 is deployed in proximity to container 22 at a second elevation, below the first elevation; and container 26 is deployed in proximity to container 24 at a third elevation, below the second elevation. The elevations are chosen to permit gravitational flow from each container to the next. Containers 22, 24 and 26 may be deployed for this purpose on sloping ground, with a height difference of at least 0.5 m between successive containers. Alternatively or additionally, the containers may be mounted on suitable pillars (not shown).

Figure 5:
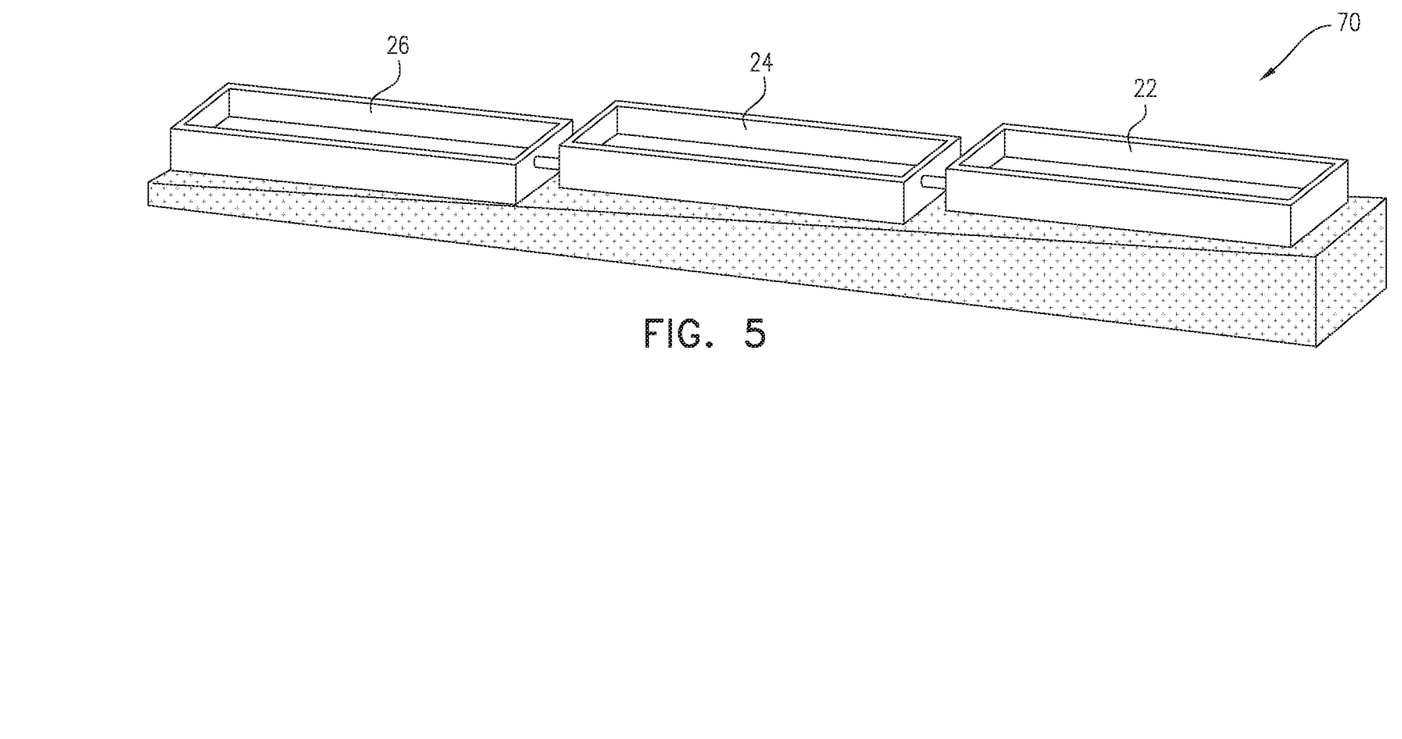
FIG. 5 is schematic pictorial illustration of a water purification system, in accordance with another embodiment of the invention.

In the embodiment shown in FIG. 1, containers 22, 24 and 26 are deployed widthwise, i.e., with their long dimensions perpendicular to the slope and to the direction of water flow. Alternatively, the containers may be deployed lengthwise (as shown in FIG. 5, for example), depending on available space and topographical constraints. As shown in the figures that follow, each container 22, 24, 26 comprises an inlet on the upper side of the container and an outlet at the opposite, lower side, with transfer pipes connecting each outlet to the next inlet.

Contaminated water, as indicated by an arrow 28, flows into system 20 from a source such as a natural body of water or a man-made pipe, tank or pond. When the water to be processed contains solids, as in the case of sewage or muddy water, a sump pipe 30 may be deployed at the input to system 20 in order to remove the solids, as indicated by an arrow 32.

The contaminated water (with or without passing sump pipe 30) enters an inlet 37 of container 22 via an inlet pipe 34, either by gravitational flow (as shown in the figure) or by means of a pump (not shown), which may be powered by solar energy. The contaminated water may flow either downward or upward into container 22, which serves as a settling chamber, allowing solids to be separated from the water either at the top of the gravel or at the bottom. In the former case, accumulated solids may periodically be removed for use as compost; whereas in the latter case, solids may be released through a dedicated valve at the bottom of the container. Purified water, as indicated by an arrow 42, exits container 26 through an outlet pipe 41.

Prior to use, containers 22, 24 and 26 are filled with different, respective substrates 36, 38 and 40, in which aquatic plants can be planted. Any suitable substrates may be used for this purpose, for example: dolomite and other carbonaceous aggregates; basalt, tufa, clay bid and other igneous aggregates; and organic matter such as peat, organic compost and bark. The aquatic plants typically used may include, for example, *Typha latifolia* (cattail), *Hydrocotyl ranunculoides* (pennyworth), *Arundo mediterranea* (giant reed), *Phragmites australis* (common reed), *Cyperus papyrus* (*papyrus*), and various *Canna* species. Alternatively or additionally, other suitable substrates and plants, as are known in the art, may be used to filter the water passing through system 20 and absorb chemical and biological contaminants in the water.

Figure 2:
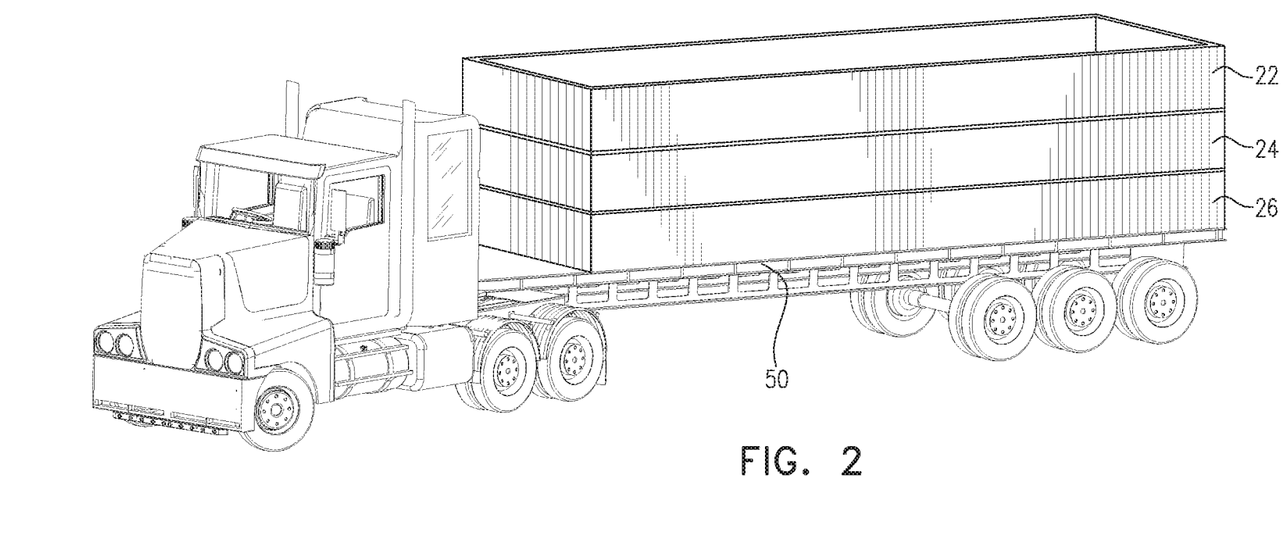
FIG. 2 is a schematic pictorial illustration showing a water purification system in a shipping configuration, in accordance with an embodiment of the invention.

FIG. 2 is a schematic pictorial illustration showing system 20 in a shipping configuration, in accordance with an embodiment of the invention. Containers 22, 24 and 26 are stacked and loaded onto a truck bed 50. In the pictured embodiment, the containers are rectangular and are at least five meters long and two meters wide, so that when stacked they have roughly the overall dimensions of a standard shipping container. Alternatively, containers 22, 24 and 26 may be shorter, for example at least three meters long and two meters wide. These dimensional ranges are particularly advantageous for efficient shipping and handling; but alternatively, containers of other sizes and shapes may be used.

Figure 3:
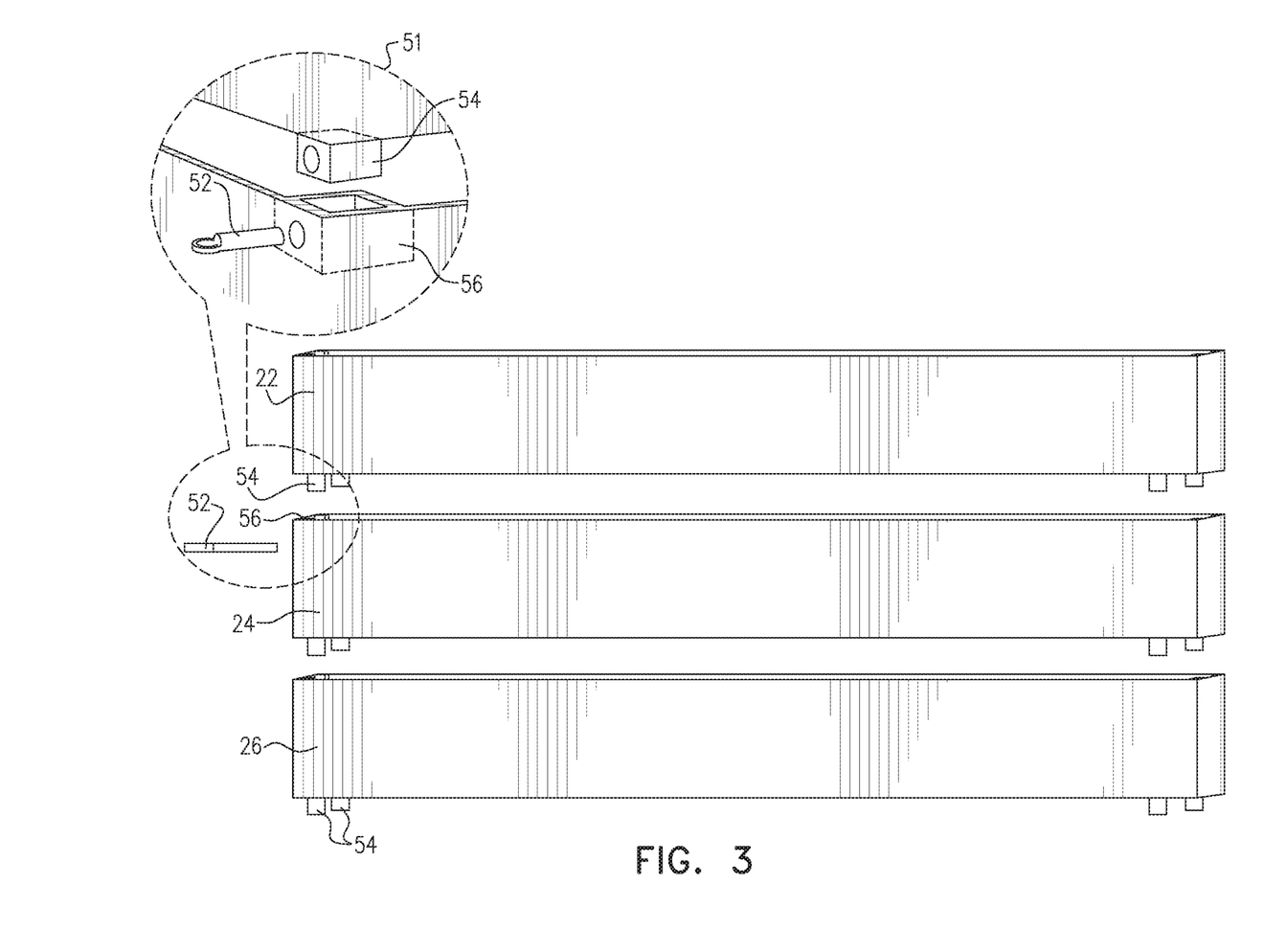
FIG. 3 is a schematic exploded view showing disassembly of the water purification system of FIG. 2 from its shipping configuration, in accordance with an embodiment of the invention.

FIG. 3 is a schematic exploded view showing disassembly of system 20 from its shipping configuration in preparation for deployment on site, in accordance with an embodiment of the invention. A mounting mechanism 51 holds the stacked containers 22, 24 and 26 together during shipment and is then released in order to permit deployment of the system. In the pictured embodiment, mechanism 51 comprises a bolt 54, located at the lower side of each container in each of its four corners, which fits into a matching socket 56 on the upper side of the container below it. A pin 52 secures bolt 54 and socket 56 together during shipment and is removed, for example using a hammer and chisel, in order to release the locking mechanism. Alternatively, other sorts of fasteners and mounting mechanisms, as are known in the art, may be used for this purpose, including simple pins that can be separated without the use of special tools.

Figure 4:
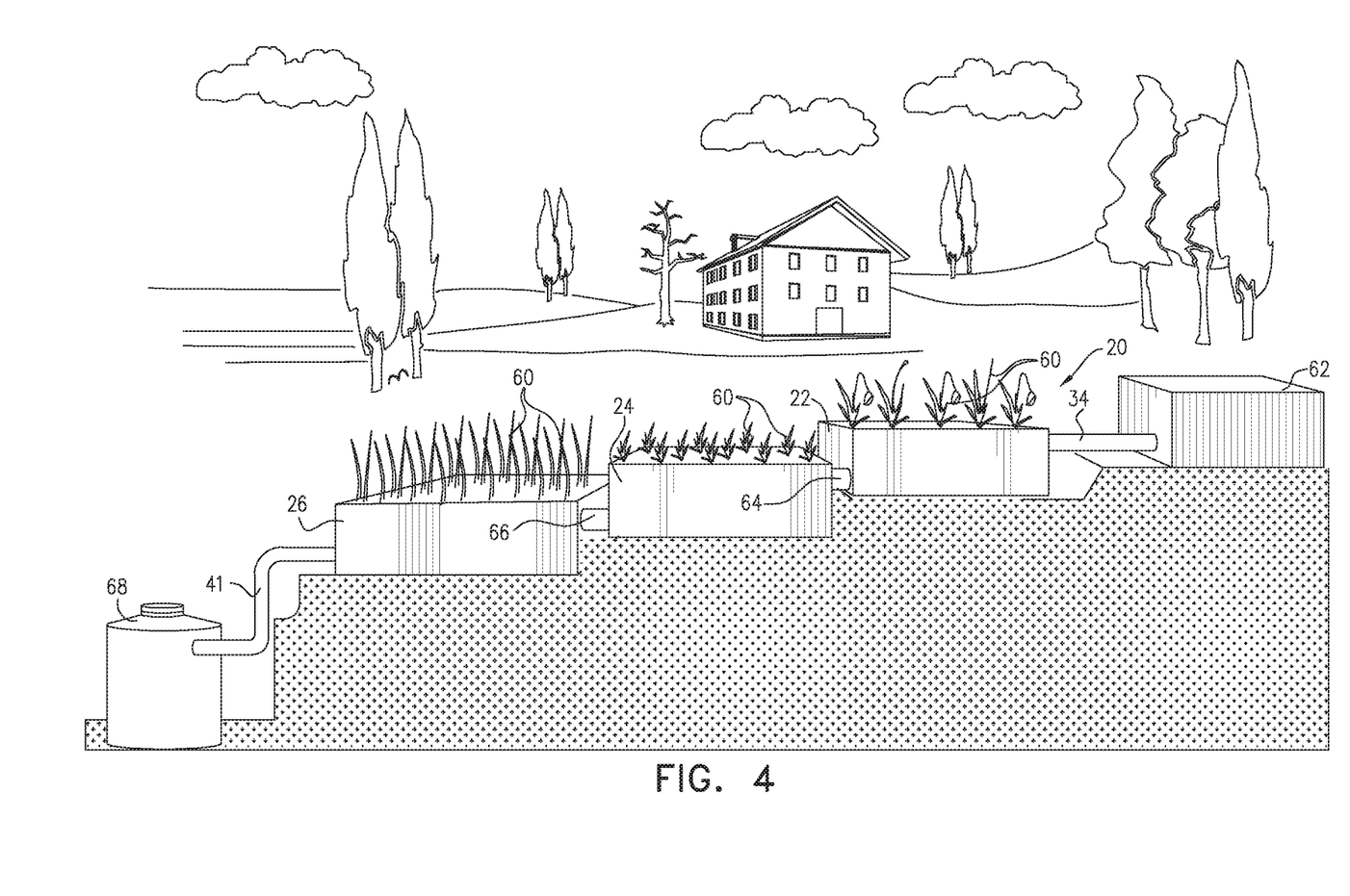
FIG. 4 is a schematic pictorial illustration showing deployment and operation of a water purification system, in accordance with an embodiment of the invention.

FIG. 4 is a schematic pictorial illustration showing deployment and operation of water purification system 20 at a water treatment site, in accordance with an embodiment of the invention. System 20 has been installed on sloping ground, and aquatic plants 60 have been planted in the substrates in containers 22, 24 and 26. Contaminated water is conveyed from an input source 62, such as a tank, pond or stream, through inlet pipe 28 to container 22. Pipes 64 and 66 connect the outlet of container 22 to the inlet of container 24 and the outlet of container 24 to the inlet of container 26. At each stage, the quality of the water transferred from the outlet of the respective container improves. Finally, the purified water from container 26 flows through outlet pipe 41, for example to a tank 68 or directly to a supply line.

FIG. 5 is schematic pictorial illustration of a water purification system 70, in accordance with another embodiment of the invention. The components and modes of assembly and operation of system 70 are substantially similar to those of system 20, as shown and described above. In system 70, however, containers 22, 24 and 26 are deployed lengthwise, in accordance with the available space and topography of the water treatment site. Containers 22, 24 and 26 may have inlets and outlets on both their long and short sides in order to permit their use in both widthwise and lengthwise arrangements.

Container Design

Figure 6:
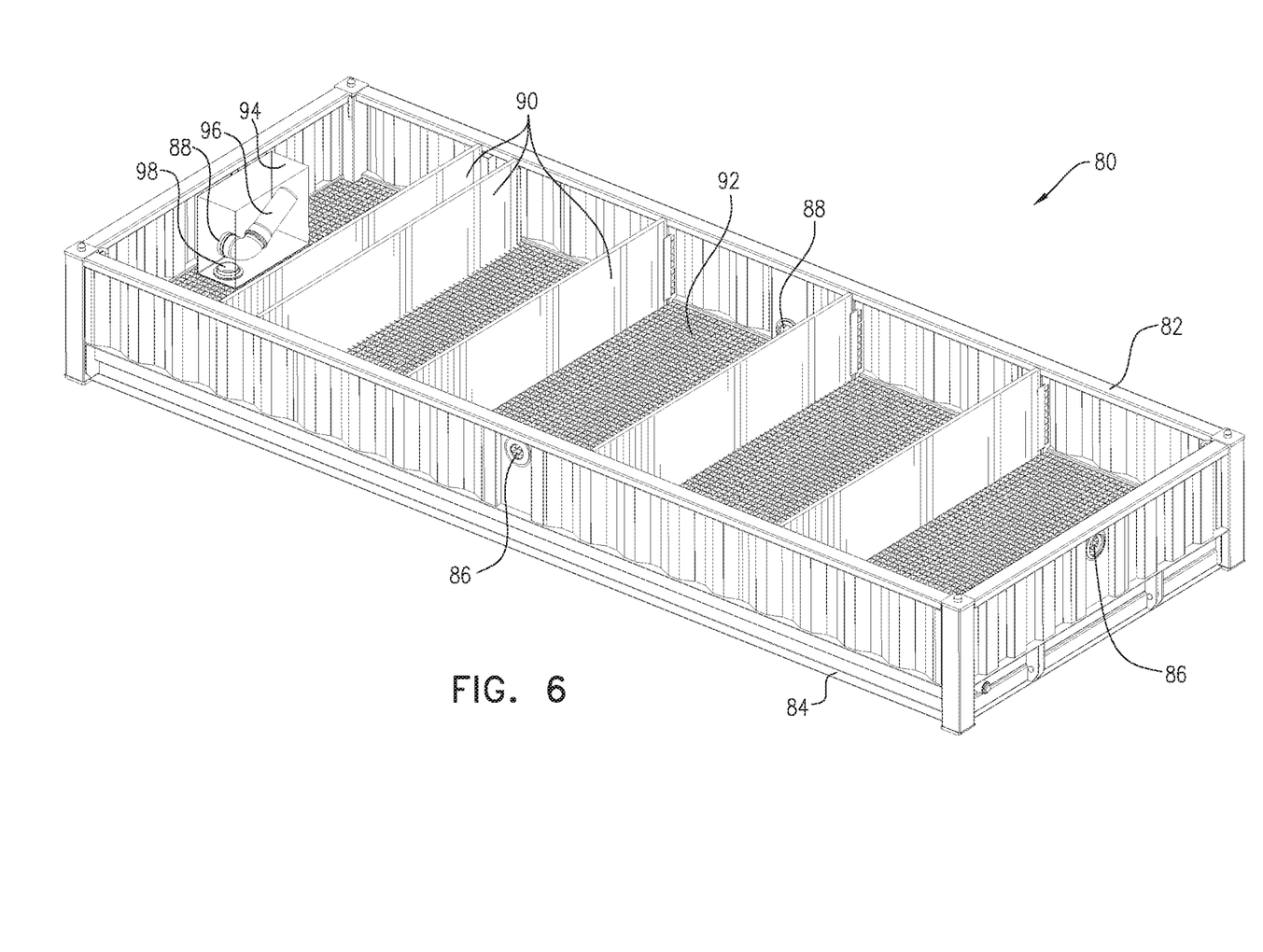
FIG. 6 is a schematic pictorial illustration of a water purification module, in accordance with an embodiment of the invention.
Figure 7:
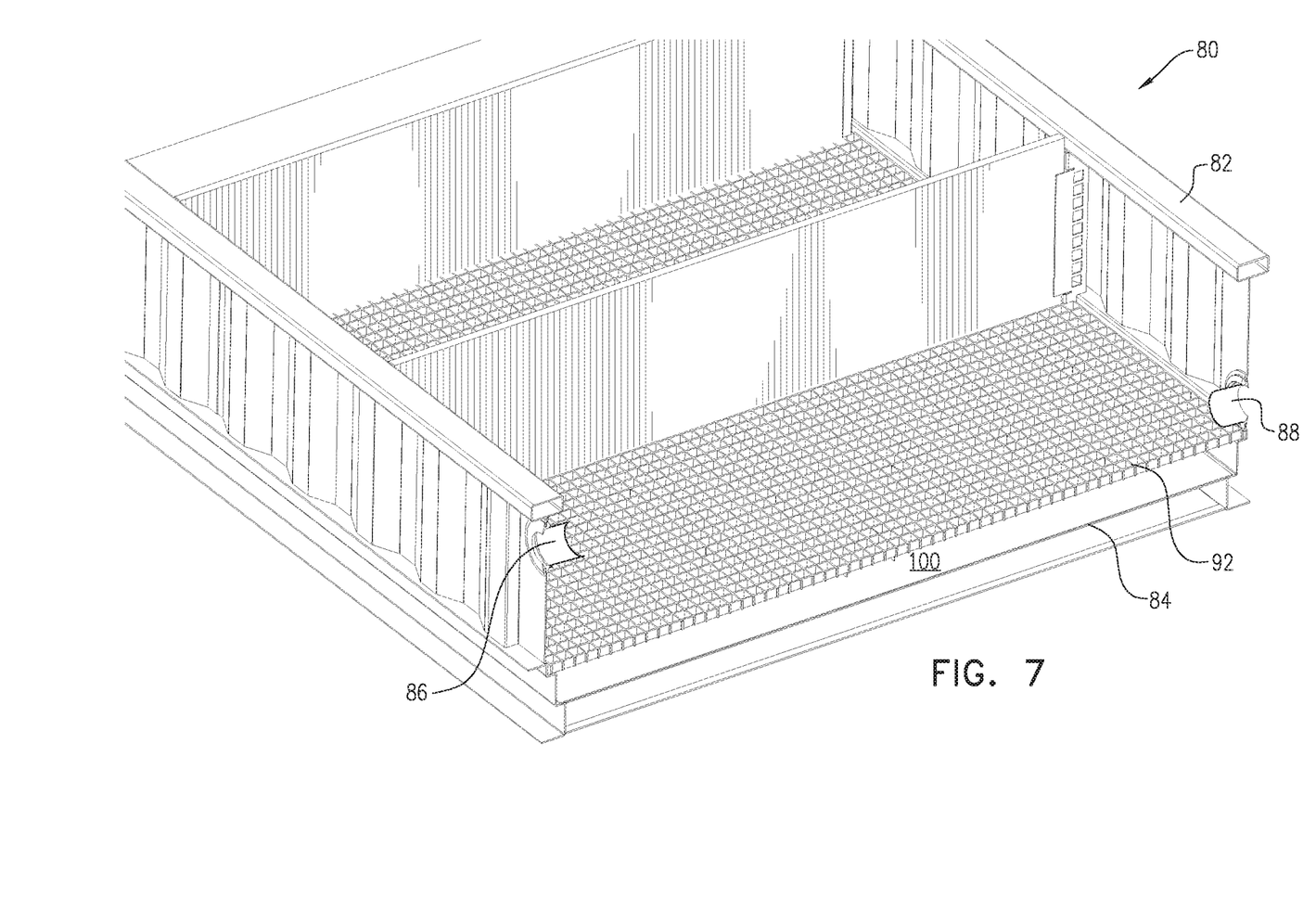
FIGS. 7 and 8 are schematic cutaway views of the water purification module of FIG. 6, in accordance with an embodiment of the invention.
Figure 8:
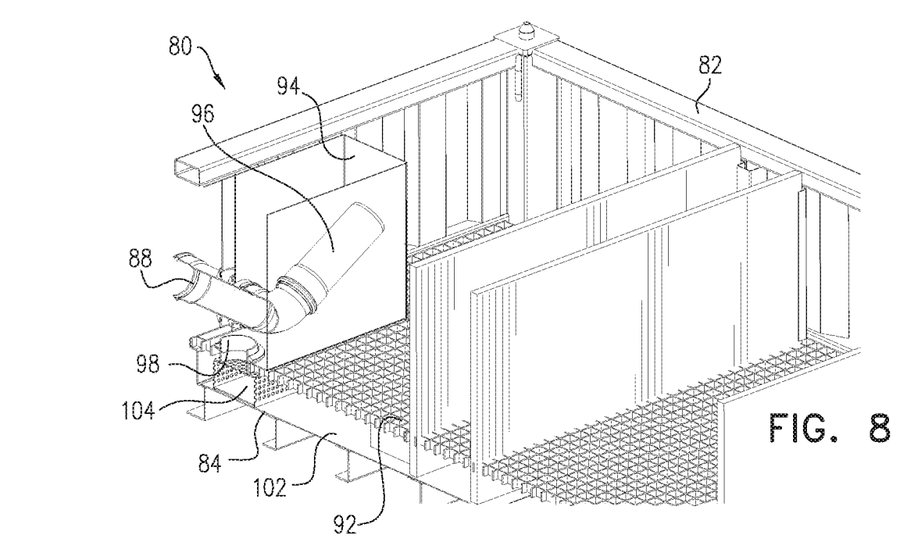
Figure 9:
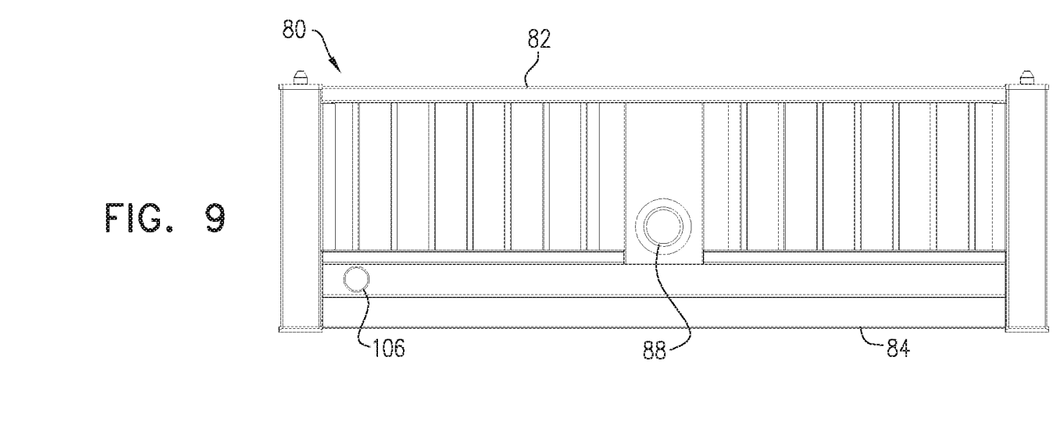
FIG. 9 is a schematic frontal view of the water purification module of FIG. 6, in accordance with an embodiment of the invention.

Reference is now made to FIGS. 6-9, which schematically illustrate a water purification module 80, in accordance with an embodiment of the invention. Module 80 comprises a container 82, which may be used in place of any or all of containers 22, 24 and 26 in systems 20 and 70, as described above. FIG. 6 is a pictorial illustration of module 80 as a whole, while FIGS. 7 and 8 are cutaway views across the width and along the length of the module, respectively. FIG. 9 is a frontal view of the module at its outlet side. Module 80 is shown here by way of example, to illustrate particular features that may be incorporated in systems in accordance with embodiments of the invention. Alternatively, other sorts of modules may be used, with different characteristics and combinations of features.

Container 82 comprises a rectangular bottom surface 84, with short sides 83 and long sides 85 attached thereto. To enable both widthwise and lengthwise deployments, inlets 86 and outlets 88 are formed in both the short and long sides of the container. (The inlet and outlet that are not in use are typically closed off). Bottom surface 84 is mechanically reinforced by beams 102. Vertical partitions 90 may be inserted into container 82, thus dividing the container into multiple compartments, which can be filled with different substrates and planted with different aquatic plants, in order to increase the versatility of water treatment.

In this embodiment, module 80 comprises a mesh flooring 92, which is disposed at a predefined height above bottom surface 84 and is configured to hold the substrates that are filled into container 82, as explained above. This configuration permits water to flow through a space 100 in container 82 below mesh flooring 92. This double-floored arrangement supports various directions of hydrological flow within module 80, such as up-flow, down-flow, and alternating tidal flows, which may be selected and adjusted depending on water treatment needs.

Module 80 also comprises an adjustable equalization tank 94 adjacent to outlet 88, for controlling the water level in container 82. Equalization tank 94 comprises a bent pipe 96, whose outlet end is rotatably connected to outlet 88 by an elastic seal. The height of the inlet end of pipe 96—and thus the water level—can be adjusted by rotation of the outlet end of the pipe about outlet 88.

As shown in FIGS. 8 and 9, a bottom drain 98 in equalization tank 94 connects to a lower drain box 104, which in turn connects to an auxiliary outlet 106. In typical operation, bottom drain and auxiliary outlet are closed off They may be opened, however, to support additional flow regimes through module 80, such as a plug-flow regime through the entire depth of container 82, as well as flushing of the substrates in container 82 for system regeneration when needed.

Figure 10:
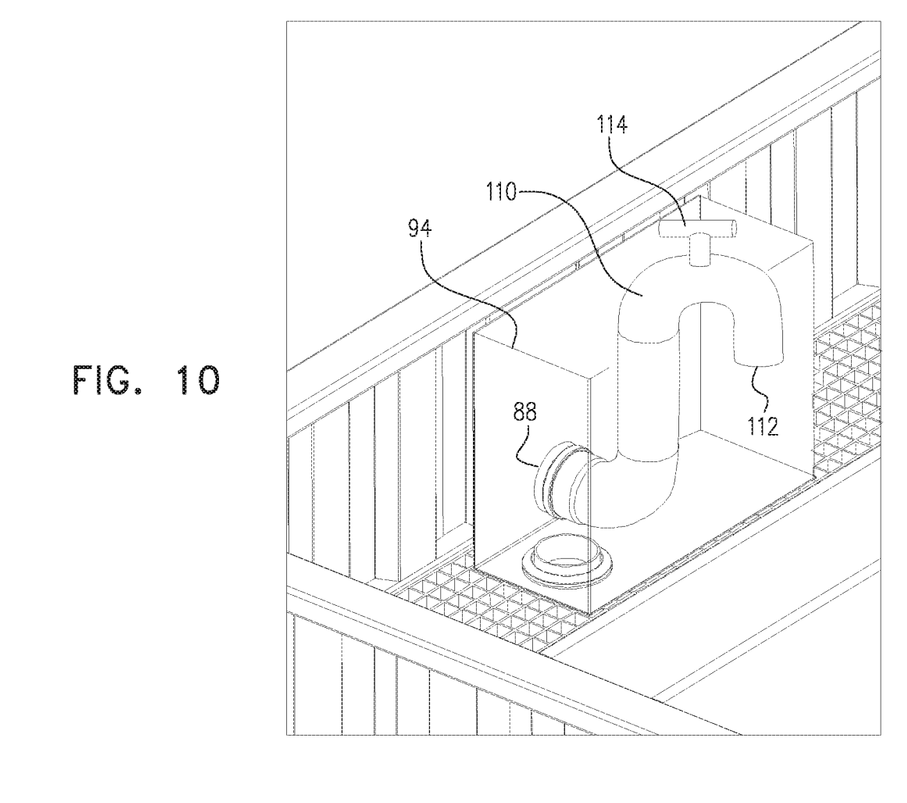
FIG. 10 is a schematic pictorial illustration of an outlet siphon in a water purification module, in accordance with an embodiment of the invention.

FIG. 10 is a schematic pictorial illustration of an outlet siphon 110 in equalization tank 94 of a water purification module, in accordance with another embodiment of the invention. Siphon may connect to outlet 88 in place of pipe 96, for example, in order to provide a mechanism for aeration of the substrates in container 82 by rapid variation of the water level in the container. As the water level rises in container 82, air in siphon 110 will block the outflow until the water reaches the top of the siphon. At this point, water will be drawn in through inlet 112 of siphon 110, inducing a rapid flow of water through the siphon until the water level again drops below the level of the inlet. A decompression valve 114 may be connected to the top of siphon 110 to allow release of any remaining air. The rapid flow induced by siphon 110 draws air in through the surface of the substrates, thus promoting beneficial biological processes.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A system for water treatment, comprising:
   a plurality of containers, comprising at least first and second containers, which are configured to be stacked one on another for shipment and to be deployed in a row at different, respective heights at a water treatment site such that the first container is deployed at a first elevation and the second container is deployed in proximity to the first container at a second elevation, below the first elevation, each container comprising an inlet at a first side of the container and an outlet at a second side of the container, opposite the first side, wherein at least one of the containers comprises an adjustable equalization tank adjacent to the outlet for controlling a water level in the at least one of the containers;
   substrates configured for planting of aquatic plants therein and comprising at least different first and second substrates for filling the first and second containers, respectively; and
   piping comprising at least an inlet pipe for connection to the inlet of the first container, a transfer pipe for connection between the outlet of the first container and the inlet of the second container, and an outlet pipe for connection to the outlet of the second container.

2. The system according to claim 1, wherein the containers are rectangular and are at least three meters long and two meters wide.

3. The system according to claim 2, wherein the containers are at least five meters long.

4. The system according to claim 1, wherein the plurality of the containers comprises a third container, which is configured to be deployed in proximity to the second container at a third elevation, below the second elevation.

5. The system according to claim 1, wherein the containers comprise a mounting mechanism, which is disposed at upper and lower sides of respective corners of the containers and is configured to hold the stacked containers together during shipment and to be released in order to permit deployment of the system.

6. The system according to claim 1, and comprising one or more vertical partitions configured for insertion into at least one of the containers so as to divide the at least one of the containers into multiple compartments, which are configured to contain different ones of the substrates.

7. The system according to claim 1, wherein the equalization tank comprises a pipe having an inlet end and an outlet end with a bend between the inlet and outlet ends, wherein the outlet end is rotatably connected to the outlet, whereby a height of the inlet end is adjustable by rotation of the outlet end about the outlet.

8. The system according to claim 1, wherein the equalization tank comprises a siphon, which is connected to the outlet and is configured to induce a variation of a water level in the at least one of the containers, thereby aerating a substrate in the at least one of the containers.

9. The system according to claim 1, wherein the first container is configured to serve as settling chamber for separation of solids from water that is input to the system.

10. The system according to claim 1, wherein the different substrates are selected from a group of compositions consisting of dolomite, carbonaceous aggregates, basalt, tufa, clay bid, igneous aggregate, peat, organic compost and bark.

11. A system for water treatment, comprising:
    a plurality of containers, comprising at least first and second containers, which are configured to be stacked one on another for shipment and to be deployed in a row at different, respective heights at a water treatment site such that the first container is deployed at a first elevation and the second container is deployed in proximity to the first container at a second elevation, below the first elevation, each container comprising an inlet at a first side of the container and an outlet at a second side of the container, opposite the first side;
    substrates configured for planting of aquatic plants therein and comprising at least different first and second substrates for filling the first and second containers, respectively, wherein the containers comprise a bottom surface and a mesh flooring, which is disposed at a predefined height above the bottom surface and is configured to hold the substrates that are filled into the containers, thereby permitting water to flow through a space in the containers below the mesh flooring; and piping comprising at least an inlet pipe for connection to the inlet of the first container, a transfer pipe for connection between the outlet of the first container and the inlet of the second container, and an outlet pipe for connection to the outlet of the second container.

12. A method for water treatment, comprising:

conveying to a water treatment site on a truck bed a plurality of containers, comprising at least first and second containers, which are stacked one on another on the truck bed, each container comprising an inlet at a first side of the container and an outlet at a second side of the container, opposite the first side, wherein at least one of the containers comprises an adjustable equalization tank adjacent to the outlet for controlling a water level in the at least one of the containers;

deploying the containers in a row at different, respective heights at the water treatment site such that the first container is deployed at a first elevation and the second container is deployed in proximity to the first container at a second elevation, below the first elevation;

connecting an inlet pipe to convey contaminated water at the water treatment site to the inlet of the first container;

connecting a transfer pipe between the outlet of the first container and the inlet of the second container;

connecting an outlet pipe to draw purified water from the outlet of the second container;

filling the deployed containers with substrates, comprising at least different first and second substrates in the first and second containers, respectively; and planting multiple different types of aquatic plants in the substrates in the containers.

13. The method according to claim 12, wherein the containers are rectangular and are at least three meters long and two meters wide.

14. The method according to claim 13, wherein the containers are at least five meters long.

15. The method according to claim 12, wherein the plurality of the containers comprises a third container, and wherein deploying the containers comprises deploying the third container in proximity to the second container at a third elevation, below the second elevation.

16. The method according to claim 12, wherein conveying the plurality of the containers comprises holding the stacked containers together using a mounting mechanism during shipment, and deploying the containers comprises releasing the mounting mechanism.

17. The method according to claim 12, wherein the containers comprise a bottom surface and a mesh flooring, which is disposed at a predefined height above the bottom surface and is configured to hold the substrates that are filled into the containers, thereby permitting water to flow through a space in the containers below the mesh flooring.

18. The method according to claim 12, and comprising inserting one or more vertical partitions into at least one of the containers so as to divide the at least one of the containers into multiple compartments, which are filled with different ones of the substrates.

19. The method according to claim 12, wherein the equalization tank comprises a pipe having an inlet end and an outlet end with a bend between the inlet and outlet ends, wherein the outlet end is rotatably connected to the outlet, and wherein controlling the water level comprises adjusting a height of the inlet end by rotation of the outlet end about the outlet.

20. The method according to claim 12, wherein the equalization tank comprises a siphon, which is connected to the outlet, and wherein controlling the water level comprises inducing a variation of the water level in the at least one of the containers by flow through the siphon so as to aerate a substrate in the at least one of the containers.

21. The method according to claim 12, and comprising separating solids from water that is input to the first container by settling of the solids in the first container.

22. The method according to claim 12, wherein filling the deployed containers comprises selecting the different substrates from a group of compositions consisting of dolomite, carbonaceous aggregates, basalt, tufa, clay bid, igneous aggregate, peat, organic compost and bark.

* * * * *